(12) United States Patent
Shin et al.

(10) Patent No.: US 9,419,275 B2
(45) Date of Patent: Aug. 16, 2016

(54) ELECTRODE MATERIAL FOR A LITHIUM-ION BATTERY AND A METHOD OF MANUFACTURING THE SAME

(75) Inventors: Ji-Yong Shin, Ispringen (DE); Jong Hoon Joo, Stuttgart (DE); Dominik Samuelis, Stuttgart (DE); Joachim Maier, Wiernsheim (DE)

(73) Assignee: MAX-PLANCK-GESELLSCHAFT ZUR FOERDERUNG DER WISSENSCHAFTEN E.V., Munich (DE)

( * ) Notice: Subject to any disclaimer, the term of this patent is extended or adjusted under 35 U.S.C. 154(b) by 641 days.

(21) Appl. No.: 13/806,723

(22) PCT Filed: Jun. 22, 2011

(86) PCT No.: PCT/EP2011/003096
§ 371 (c)(1),
(2), (4) Date: Jun. 6, 2013

(87) PCT Pub. No.: WO2011/160837
PCT Pub. Date: Dec. 29, 2011

(65) Prior Publication Data
US 2015/0287982 A1 Oct. 8, 2015

(30) Foreign Application Priority Data
Jun. 25, 2010 (EP) .................................... 10006647

(51) Int. Cl.
*H01M 4/36* (2006.01)
*H01M 4/485* (2010.01)
(Continued)

(52) U.S. Cl.
CPC .............. *H01M 4/366* (2013.01); *H01M 4/131* (2013.01); *H01M 4/485* (2013.01); *H01M 4/505* (2013.01); *H01M 4/525* (2013.01); *H01M 4/625* (2013.01);
(Continued)

(58) Field of Classification Search
CPC ....... H01M 4/02; H01M 4/0471; H01M 4/13; H01M 4/48; H01M 4/485
See application file for complete search history.

(56) References Cited

U.S. PATENT DOCUMENTS

2002/0039684 A1* 4/2002 Matsubara ............ H01M 4/133
429/231.4
2003/0133867 A1* 7/2003 Lyons et al. ................ 423/592.1
(Continued)

FOREIGN PATENT DOCUMENTS

DE 102008050692 A1 4/2010
EP 1925592 A2 5/2008

OTHER PUBLICATIONS

Q. Zhao, P. Wu, B. L. Li, Z. M. Lu, and E. Y. Jiang.Room-Temperature Ferromagnetism in Semiconducting TiO2-δ Nanoparticles, Chin. Phys. Lett. vol. 25, No. 5, (2008), 1811-1814.*
(Continued)

*Primary Examiner* — Carlos Barcena
(74) *Attorney, Agent, or Firm* — Kilpatrick Townsend & Stockton LLP

(57) ABSTRACT

An electrode material for a lithium-ion battery comprises a porous agglomeration of particles, the particles being formed from nanopowder of a transition metal oxide and comprising cores of stoichiometric transition metal oxide surrounded by under stoichiometric oxide of the transition metal. Also described and claimed are the use of a corresponding material in a lithium ion battery and a method of making such an electrode.

17 Claims, 11 Drawing Sheets

(51) Int. Cl.
*H01M 4/131* (2010.01)
*H01M 4/505* (2010.01)
*H01M 4/525* (2010.01)
*H01M 4/62* (2006.01)
*H01M 4/66* (2006.01)
*H01M 10/0525* (2010.01)

(52) U.S. Cl.
CPC ........... *H01M 4/661* (2013.01); *H01M 10/0525* (2013.01); *Y02E 60/122* (2013.01); *Y02P 70/54* (2015.11); *Y02T 10/7011* (2013.01)

(56) References Cited

U.S. PATENT DOCUMENTS

| | | |
|---|---|---|
| 2004/0048156 A1 | 3/2004 | Thackeray et al. |
| 2007/0248678 A1* | 10/2007 | Woo et al. ..................... 424/489 |
| 2008/0003503 A1 | 1/2008 | Kawakami et al. |

OTHER PUBLICATIONS

Q. Zhao, P. Wu, B. L. Li, Z. M. Lu, and E. Y. Jiang. Activation of room-temperature ferromagnetism in nonstoichiometric TiO2-δ powders by oxygen vacancies, J. Appl. Phys. 104, 073911( 2008).*
Aricó, Antonino Salvatore et al., "Nanostructured materials for advanced energy conversion and storage devices," Nature Materials, May 2005, vol. 4, pp. 366-377.
Bruce, Peter G. et al., "Nanomaterials for Rechargeable Lithium Batteries," Angewandte Chemie International Edition, Mar. 12, 2008, vol. 47, pp. 2930-2946.
Dominko, R. et al., "Impact of the Carbon Coating Thickness on the Electrochemical Performance of LiFePO4 / C Composites," Journal of the Electrochemical Society, 2005, vol. 152, issue 3, A607-A610.
Eder, Dominik et al., "Electric Impedance Spectroscopy of Titania: Influence of Gas Treatment and of Surface Area," The Journal of Physical Chemistry B, 2004, vol. 108, issue 39, pp. 14823-14829.
Fu, L. J. et al., Novel TiO2/C nanocomposites for anode materials of lithium ion batteries, Journal of Power Sources, Sep. 13, 2006, vol. 159, issue 1, pp. 219-222.
Gribb, Amy et al., "Particle size effects on transformation kinetics and phase stability in nanocrystalline TiO2," American Mineralogist, 1997, vol. 82, No. 7-8, pp. 717-728.
Guo, Yu-Guo et al., "Nanostructured Materials for Electrochemical Energy Conversion and Storage Devices," Advanced Materials, Aug. 4, 2008, vol. 20, issue 15, pp. 2878-2887.
Guo, Yu-Guo et al., "Superior Electrode Performance of Nanostructured Mesoporous TiO2 (Anatase) through Efficient Hierarchical Mixed Conducting Networks," Advanced Materials, Aug. 2007, vol. 19, issue 16, pp. 2087-2091.
Guo, Yu-Guo et al., "Synthesis of hierarchically mesoporous anatase spheres and their application in lithium batteries," Chemical Communications, May 25, 2006, issue 26, pp. 2783-2785.
He, Ben-Lin et al., "Preparation and electrochemical properties of Ag-modified TiO2 nanotube anode material for lithium-ion battery," Electrochemistry Communications, Mar. 2007, vol. 9, issue 3, pp. 425-430.
Hébrard, Jean-Luc et al., "Initial Sintering of Submicrometer Titania Anatase Powder," Journal of the American Ceramic Society, Jan. 1990, vol. 73, issue1, pp. 79-84.
Hu, Yong-Sheng et al., "High Lithium Electroactivity of Nanometer-Sized Rutile TiO2," Advanced Materials, Jun. 2006, vol. 18, issue 11, pp. 1421-1426.
Kim, Min Gyu et al., "Reversible and High-Capacity Nanostructured Electrode Materials for Li-Ion Batteries," Advanced Functional Materials, May 22, 2009, vol. 19, issue 10, pp. 1497-1514.
Lafont, U. et al., "In Situ Structural Changes upon Electrochemical Lithium Insertion in Nanosized Anatase Ti02," The Journal of Physical Chemistry C, 2010, vol. 114, issue 2, pp. 1372-1378.
Lee, Du-Hee et al., "Preparation of Brookite-Type TiO2/Carbon Nanocomposite Electrodes for Application to Li Ion Batteries," European Journal of Inorganic Chemistry, Feb. 2008, vol. 2008, issue 6, pp. 878-882.
Li, Guangshe et al., "High Purity Anatase TiO2 Nanocrystals: Near Room-Temperature Synthesis, Grain Growth Kinetics, and Surface Hydration Chemistry," Journal of the American Chemical Society, 2005, vol. 127, issue 24, pp. 8659-8666.
Ma, Jianxin et al., "Kinetic characteristics of mixed conductive electrodes for lithium ion batteries," Journal of Power Sources, Feb. 10, 2007, vol. 164, issue 2, pp. 849-856.
Maier, J., "Nanoionics: ion transport and electrochemical storage in confined systems," Nature Materials, Nov. 2005, vol. 4, pp. 805-815.
Moriguchi, Isamu et al., "A Mesoporous Nanocomposite of TiO2 and Carbon Nanotubes as a High-Rate Li-Intercalation Electrode Material," Advanced Materials, Jan. 2006, vol. 18, issue 1, pp. 69-73.
Nowotny, J. et al., "Chemical diffusion in metal oxides. Example of TiO2," Ionics, Sep. 2006, vol. 12, issue 3, pp. 227-243.
Olson, Carol L. et al., "Defect Chemistry, Surface Structures, and Lithium Insertion in Anatase TiO2," The Journal of Physical Chemistry B, 2006, vol. 110, issue 20, pp. 9995-10001.
Poizot, P. et al., "Nono-sized transition-metal oxides as negative-electrode materials for lithium-ion batteries," Nature, Sep. 28, 2000, pp. 496-499.
Shin, Ji-Yong et al., "Oxygen-Deficient TiO2-δ Nanoparticles via Hydrogen Reduction for High Rate Capability Lithium Batteries," Chemistry of Materials, 2012, vol. 24, issue 3, pp. 543-551.
Shukla, Satyajit et al., "Reduced Activation Energy for Grain Growth in Nanocrystalline Yttria-Stabilized Zirconia," Nano Letters, 2003, vol. 3, No. 3, pp. 392-401.
Sudant, Guillaume et al., "Electrochemical lithium reactivity with nanotextured anatase-type TiO2," Journal of Materials Chemistry, 2005, vol. 15, pp. 1263-1269.
Tarascon, J.-M. et al., "Issues and challenges facing rechargeable lithium batteries," Nature, Nov. 15, 2011, vol. 414, pp. 359-367.
Wang, Donghai et al., "Self-Assembled TiO2-Graphene Hybrid Nanostructures for Enhanced Li-Ion Insertion," ACS Nano, 2009, vol. 3, No. 4, pp. 907-914.
Wang, John et al., "Pseudocapacitive Contributions to Electrochemical Energy Storage in TiO2 (Anatase) Nanoparticles," The Journal of Physical Chemistry C, 2007, vol. 111, No. 40, pp. 14925-14931.
Weibel, A. et al., "Electrical properties and defect chemistry of anatase (TiO2)," Solid State Ionics, Jan. 31, 2006, vol. 177, issues 3-4, pp. 229-236.
Whittingham, M. Stanley, "Lithium Batteries and Cathode Materials," Chemical Reviews, Sep. 14, 2004, vol. 104, pp. 4271-4301.
Xu, YuHong et al., "Simple annealing process for performance improvement of silicon anode based on polyvinylidene fluoride binder," Journal of Power Sources, Apr. 2, 2010, vol. 195, issue 7, pp. 2069-2073.
Yamada, A. et al., "Optimized LiFePO4 for Lithium Battery Cathodes," Journal of the Electrochemical Society, 2001, vol. 148, issue 3, pp. A224-A229.
Zhong, Qian et al., "Local Structure of Defects on Hydrogen- and Vacuum-Reduced TiO2 Surfaces," Journal of the American Ceramic Society, May 1993, vol. 76, issue 5, pp. 1137-1142.
Zhou, Haoshen et al., "A Self-Ordered, Crystalline-Glass, Mesoporous Nanocomposite for Use as a Lithium-Based Storage Device with Both High Power and High Energy Densities," Angewandte Chemie International Edition, Jan. 21, 2005, vol. 44, issue 5, pp. 797-802.
International Search Report from PCT Application No. PCT/EP2011/003096 mailed Sep. 9, 2011 (3 pages).
Shin, Ji-Yong, Chemistry of Materials, "Oxygen-Deficient TiO2-δ Nanoparticles via Hydrogen Reduction for High Rate Capability Lithium Batteries", 2012, pp. 543-551, pubs.acs.org/cm, Stuttgart, Germany.

* cited by examiner

Concentration profiles

Ti/O phase diagram

Temperature ~450 °C, p(O$_2$) ~ 6.7 x 10$^{-25}$

[A. Wiebel, R. Bouchet, P. Knauth Solid State Ionics 176 (2005) 663–668]

"Reduced TiO$_{2-\delta}$"

ELECTRODE MATERIAL FOR A LITHIUM-ION BATTERY AND A METHOD OF MANUFACTURING THE SAME

This application is a U.S. National Phase under 35 USC 371 of PCT Application No. PCT/EP2011/003096 filed Jun. 22, 2011, which claims priority to European Application No. 10006647.1, filed Jun. 25, 2010, the disclosures of which are incorporated by reference herein.

The present invention relates to an electrode material for use in a lithium ion battery, to an electrode, to use of a transition metal oxide as an electrode for a lithium ion battery and to a method of manufacturing an electrode material.

The primary advantage of secondary batteries such as lithium ion batteries is their rechargeability. In the early 1990s, further needs such as portability for energy storage devices became of importance in today's society with the rapid development of portable electronic equipments. From the small-scale electronics, for example, laptop computers and mobile phones there is a requirement for lightweight, powerful and easily rechargeable batteries. The currently expanding trend to large-scale hybrid electric vehicles (HEVs), makes the development of lightweight and efficient battery systems becoming of paramount importance. Electrochemical energy storage by Li-ion batteries is of particular interest as an important technology because of its high energy and power densities which results in lighter and more compact devices, compared to other types of energy storage devices. In this connection reference can be made to the references 1, 2, 3 and 4.

As a suitable type of materials for Li-ion battery systems, transition-metal oxides are known to be very promising, due to their structural stability in maintaining their integrity over many charge/discharge cycles (see e.g. reference 5). Amongst various transition metal oxides for use in negative electrodes, titanium dioxides ($TiO_2$) recently have been studied mainly due to characteristics of low-voltage insertion of lithium, low volume changes during discharge/charge cycles. See for example references 6, 7 and 8.

However, it is known that battery performances are severely limited by poor chemical diffusion of lithium in all polymorphs of $TiO_2$ resulting from both slow lithium-ion diffusion and poor electron transport in electrochemically active $TiO_2$ host materials. This is explained in references 4 and 9.

Numerous studies have been done so far to improve storage kinetics of lithium-ions, see references 10 and 11. One of the exemplary approaches to address slow lithium-ion diffusion is so called 'nano-structuring', which means a use of nano-sized $TiO_2$ particles and/or nanoporous structures, see references 7 and 12 which report the advantage of nanometer-sized rutile phase of $TiO_2$, in which much higher electroactivity towards lithium-ion insertion was observed than in micrometer-sized rutile, see reference 7. Our recent report also showed notably increased both storage capacity and rate capability in nanoporous anatase phase of $TiO_2$ synthesized by template-free method. The pores arise simply due to the fact that the material comprises an agglomeration of particles with spaces inevitably present between them.

The nanoporous $TiO_2$ with high surface area after calcination (~222 $m^2/g$), containing uniform pores with a diameter of ~6 nm delivered fully reversible capacity up to 200 mAh/g with very little capacity decay at high current density of 1.680 A/g due to surface storage phenomena. As described in reference 13 nano-structuring is mainly beneficial to provide shorter diffusion lengths for lithium-ion diffusion than micrometer-sized structures. As storage time, $\tau_{eq}$ varies according to $L^2$, where L is a diffusion length of lithium-ion, storage time can be subsequently saved by reducing diffusion length. Larger electrode/electrolyte contact area is another advantage of nano-structuring which leads to improved high current rate discharge/charge capacities. Furthermore, new storage mechanism of lithium, namely pseudocapacitive effect can be introduced to nanostructured materials by means of large surface area. The surface lithium storage phenomena have been reported as another possible storage mechanism of nano-sized materials beyond lithium-intercalation reaction. Wang et al. (reference 14) demonstrated that capacitive contributions become increasingly important. Diffusion controlled lithium-ion intercalation process at particle sizes below 10 nm lead to greater amounts of total stored charge with decreasing $TiO_2$ particle size.

From the viewpoint of the electron transport, improvement of its kinetics in electrode materials has been widely studied with different approaches. The non-existence of electronically conductive pathways between anatase particles and current collector resulting from low electronic conductivity of anatase leads to extremely poor charge/discharge kinetics especially at high rates. For this reason, conductive coatings, mainly by carbon, have been used for both anode and cathode materials, see references 15, 16 and 17.

Additionally, formation of conductive networks by either introducing conductive second phases, of, for example, carbon nanotubes is known from reference 18, graphene from reference 19 and nano-sized metal (oxide) particles from reference 8 and reference 20. Doping with a supervalent ion is another effective way to improve electron transport between active material and current collectors. However, a major disadvantage of adding a second phase for enhanced electronic conductivity is the large volume fraction that is required to form a percolating network (typically around 30 vol. % for random arrangement of the second phase). In addition, beyond the contribution of the additives to enhance electronic conductivity of the active material, they are sometimes disadvantageous with regard to obtaining excellent electrochemical lithium storage properties or give rise to safety concerns due to unpredictable reactions of these secondary phases in lithium batteries. Moreover, from the point of view of materials preparation, it is difficult to chemically or physically decorate the conductive additives in a homogeneous way with nanosized lithium host materials. In that sense, controlling intrinsic defect sites of the anatase $TiO_2$ particles by means of gas-solid reactions in order to modify electronic conductivity without using additional conductive materials can be another attractive way to produce high performance lithium batteries.

The object of the present invention is to provide an electrode material which has improved storage properties in comparison to prior art electrode materials.

According to the present invention there is provided an electrode material for a lithium-ion battery comprising a porous agglomeration of particles, the particles being formed from nanopowder of a transition metal oxide and comprising cores of stoichiometric transition metal oxide surrounded by an under stoichiometric oxide of the transition metal.

In prior art electrode materials, electronic connectivity of the electrode particles to the current collector is typically achieved by coating the particles with conductive substances such as carbon or $RuO_2$, giving rise to a number of disadvantages. Besides possible side reactions with other components of the battery, carbon coatings inevitably take up ample space in the electrode assembly, thereby reducing total volumetric capacity. Furthermore, it is difficult to homogeneously coat electrode particles. If the electrode material is subject to volume expansion upon Li insertion (e.g. Si, Sn, $SnO_2$), coatings typically break after some charge/discharge cycles. In contrast, the present invention presents a method to directly form an outer conductive shell in the electrode particles themselves by means of a simple, cheap gas/solid reaction. The extent of that shell can be varied by changing the processing time and temperature, allowing to optimize conditions for a range of materials. Since the conductive zone is part of the electrode material itself, volumetric capacity is not reduced by this method. The shell thickness is always homogeneous. The conductive zone can withstand volume expansion upon Li insertion, since it is part of the electrode material itself and therefore subject to the same volume expansion. Finally, the method requires lower temperatures than carbon coating and therefore results in cheaper production of such electrode materials.

In an embodiment of the electrode material said transition metal oxide is selected from the group comprising Sc, Ti, V, Cr, Mn, Fe, Co, Cu, Zn, Y, Zr, Nb, Mo, Tc, Ru, Rh, Ag, Cd, La, Hf, Ta, W, Re, Os, Ir, Pt, Au and Hg and is especially Ti, or wherein said core and/or said surrounding under stoichiometric oxide (or shell) optionally consist of an oxide of an alloy of two or more transition metals.

In an embodiment of the electrode material said nanoparticles have average dimensions in the range from 5 nm to 900 nm.

In an embodiment of the electrode material the pores within the porous agglomerate have sizes in the range from 1 nm to 1 μm and preferably comprise a bimodal pore distribution with at least first pores in the size range from 1 to 50 nm and at least second pores in the size range from 50 nm to 1 μm, said sizes being the diameters of spheres of equivalent volume to the respective pores, said first pores preferably being present with a volume of 1% to 5% of the total volume of the active material of the electrode material and said second pores preferably being present with a volume of 5% to 20% of the total volume of the active material, said upper limit of 1 μm not excluding the presence of up to 10% by volume relative to the total volume of the second pores of pores of larger dimensions and said lower limit of 1 nm not excluding the presence of 1% by volume relative to the total volume of the first pores of pores of smaller dimensions.

The primary particle size is approximately in the range of 3 to 50 nm and is the smallest repeat shape/size of particles. These primary particles form agglomerates having sizes in the range of from 10 nm to 1 μm. The pores are either monomodal pores in the size range of e.g. from 1 nm to 50 nm or bimodal pores having a first maximum pore dimension in the range of from e.g. 2 to 10 nm and a second maximum pore dimension in the range of e.g. 50 to 500 nm.

In an embodiment of the electrode material, for a tetravalent transition metal oxide (such as $TiO_2$), the oxygen content of the under stoichiometric oxide lies in the range from 1.6 to 1.99, preferably in the range from 1.8 to 1.99, for a trivalent transition metal oxide (such as $Fe_2O_3$) the oxygen content of the under stoichiometric oxide lies in the range of 2 to 2.99, preferably from 2.6 to 2.99, and for a hexavalent transition metal oxide (such as $MoO_3$) the oxygen content of the under stoichiometric oxide lies in the range of 5 to 5.9, preferably from 5.6 to 5.9.

In an embodiment of the electrode material the percentage of the under stoichiometric oxide is selected to yield an electrical conductivity in the range from $1.5 \times 10^{-3}$ Siemens/cm to $4.4 \times 10^{-2}$ Siemens/cm in the absence of conductivity enhancing additives such as carbon.

In a further aspect the present invention also relates to an electrode which includes an electrode material in accordance with the invention, wherein a conductive material is present, in at least said surrounding under stoichiometric oxide and preferably in said core and said surrounding under stoichiometric oxide.

Such an electrode has improved storage properties with regard to the prior art. For example, lithium storage properties of pristine anatase $TiO_2$ could be notably improved by surface modification by means of intrinsic defects without the use of any secondary phases.

In an embodiment of the electrode an element of said conductive material is carbon.

In a further embodiment of the electrode the porous agglomerate is bonded to a carrier foil, consisting for example of Cu or Ti.

The present invention also relates to the use of a transition metal oxide in the form of a porous agglomerate of nanopowders as an electrode material in a lithium-ion battery, wherein the particles of the powder comprise cores of stoichiometric oxide surrounded by shells of under stoichiometric oxide.

Moreover a method of manufacturing an electrode material in accordance the present invention includes the steps of:
  heating a nanopowder of a transition oxide material in a gas atmosphere comprising a reducing agent and an inert gas, at a temperature in the range from 250° C. to 800° C., with the oxygen partial pressure in the atmosphere being selected to be less than $10^{-15}$ bar, preferably less than $10^{-25}$ bar and with the treatment at the elevated temperature being carried out for a time in the range between 1 second and 7 hrs, preferably between 1 hr and 7 hr,
  optionally subsequently mixing the nanopowder with a conductive material such as carbon in a fine particulate form, such as carbon black,
  mixing the nanopowder with a binder and
  subsequently roasting the mixture to remove volatile elements of the binder leaving a porous agglomerate of the nanopowder.

The inert gas atmosphere can e.g. be Ar or $N_2$. In those cases where a reducing agent is added to the inert gas atmosphere, the reducing agent can e.g. be $H_2$ or $N_2O$. In a particularly preferred embodiment the $TiO_2$ is heated under a gas atmosphere of 5% $H_2$ and 95% Ar including natural contaminants of typically 1%. The level of natural contaminants present in the inert gas has to be less than the amount of reducing agent present.

In an embodiment of the method the mixture of nanopowder and binder is applied to a metal foil, such as titanium or copper, and is roasted on the metal foil, whereby the porous agglomerate of nanopowder is formed and bonded to said foil.

In an embodiment of the method said nanopowder is subjected to a step of pre-treatment.

In an embodiment of the method the step of pre-treatment includes the step of heating the electrode material in an inert gas atmosphere carrying a reducing agent at a temperature in the range of 50 to 450° C. for a period in the range of 1 second to 1 hour.

Further advantageous embodiments of the invention naturally result from the dependent claims and from the embodiments described in the drawings.

The invention will be described in the following by way of example only and with reference to embodiments and to the accompanying drawings which show:

FIG. 1 an x-ray diffraction patterns of pristine $TiO_2$, Ar annealed $TiO_2$, sr-$TiO_{2-\delta}$ and hr-$TiO_{2-\delta}$;

FIGS. 2a-2d FESEM images of a) pristine TiO$_2$, b) Ar, annealed TiO$_2$, c) sr-TiO$_{2-\delta}$ and d) hr-TiO$_{2-\delta}$;

FIGS. 3a-3c the DC-conductivity of TiO$_2$;

FIGS. 4a-4b the charge and discharge capacities of various TiO$_2$ compounds;

FIGS. 5a-b galvanostatic Li-insertion/extraction curves of a) sr-TiO$_{2-\delta}$ and b) hr-TiO$_{2-\delta}$; at a current density of 0.2 C (67.2 mA7g)

FIG. 5c corresponding discharge capacity proportions of region A (solid solution domains), region B (lithium intercalations) and region C (surface storages) of sr-TiO$_{2-\delta}$;

FIGS. 6a-6b variation of charge (filled-point) and discharge (open-point) capacity vs cycle number for slightly reduced (□, ■), heavily reduced (○, ●) TiO$_{2-\delta}$, and pristine (stoichiometric) (▲, △) TiO$_2$ cycled at constant current rate of a) 1 C (336 mA/g) and b) 10 C (3.36 A/g);

FIG. 6c current density dependence of the discharge capacity of different anatase TiO$_2$ samples;

FIG. 7 a proposed lithium storage mechanism in surface treated TiO$_{2-\delta}$ nanocrystalline via H2-reduction;

FIG. 8 experimental procedure to prepare H2-reduced anatase TiO$_{2-\delta}$ nanocrystalline;

FIG. 9 the poor chemical diffusion of lithium in the TiO$_2$ anatase phase;

FIG. 10 the formation of mixed conducting networks;

FIG. 11 the theoretical background reduction mechanism;

FIG. 12 Ti/O phase diagrams as a function of a) p(O$_2$) and of b) x$_{oxygen}$;

FIG. 13 the electrical properties of TiO$_2$ in dependence on the exposure time

FIG. 14 the degree of reduction of conductive properties of TiO$_2$; and

FIG. 15 the stability of H$_2$-reduced TiO$_{2-\delta}$ electrodes.

In general, TiO$_2$ is known to be an oxygen deficient material (TiO$_{2-\delta}$), thus its n-type semiconducting properties are affected by oxygen vacancies and titanium interstitials (both tri- and tetravalent) (see reference 21). Here, redox (reduction and oxidation) chemistry according to oxygen partial pressure, p(O$_2$), plays a important role to control the stoichiometry of and/or electronic conduction behavior of TiO$_2$, in which reduced TiO$_{2-\delta}$ can cause an increase in electronic conductivity. During reduction processes, it was found that excessive electrons are formed to enhance electronic conductivity by removal of oxygen leaving a surface vacancy and two electrons in titania particles (see reference 22).

In the present proposal excellent lithium storage performances of TiO$_2$ anatase particles as an anode material of lithium batteries is achieved by slightly reducing the anatase particles, introducing a small oxygen non-stoichiometry which may ultimately construct three-dimensionally interconnected conductive networks in the material. These slightly oxygen deficient anatase TiO$_{2-\delta}$ particles show excellent lithium storage performances, especially at high charge/discharge rates. The present work uses gas-solid reaction as a tool, namely H$_2$ thermal treatment to increase n-type conductivity by controlling intrinsic defects of TiO$_2$ anatase nanoparticles. The electrochemical lithium storage performances are investigated in conjunction with in situ monitoring of its electrical conductivity, which is directly correlated with its electrochemical performances.

The invention will now be explained in more detail with reference to the transition metal oxide TiO$_2$. The defect structure of TiO$_2$, which is oxygen-deficient n-type semiconductor, is rather complex to explain. The various point defects could be generated in anatase structure for example, oxygen vacancies, interstitial or substitutional Ti$^{3+}$ ions, and interstitial Ti$^{4+}$ ions. Moreover, superficial hydroxyl species may be regarded as point defects located at normal anionic sites. The equilibrium with oxygen can be written, according to following Kroger-Vink notation.

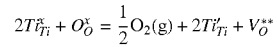

Here two different possible mechanisms of the defect formation for Ar-annealed, and H$_2$-reduced TiO$_{2-\delta}$ particles can be considered. Defect formation in Ar-annealed TiO$_2$ can be mainly ascribed to thermally activated creation of oxygen defects. Oxygen vacancies (small concentration though) could be formed by thermal annealing process (under Ar). Then the rate-controlling step in Ar-annealing might be the diffusion of oxygen anions through the lattice towards the surface in response to the oxygen activity gradient, see reference 23.

Defect formation in highly reducible atmosphere (under 5% H$_2$/Ar) can mainly be explained by reduction-related creation of oxygen defects. The mechanism forming defects in H$_2$-reduced TiO$_{2-\delta}$ seems to be more complex than that of Ar-annealed anatase particles. Zhong et al. (reference 24) proposed possible mechanisms of the defect formation in H$_2$-reduced TiO$_{2-\delta}$ system. The first step is dehydration reaction, in which thermally activated surface oxygen anions in TiO$_2$ i.e. O$^{2-}$ may react with hydrogen molecule, resulting in surface reduction. Then the propagation of reduction from surface to bulk can be explained by two possible mechanisms either by diffusion of oxygen vacancies (V$_o$) or diffusion of hydrogen species. i) If we assume that the hydrogen/oxygen reaction is limited to the surface and the reduction is kinetically controlled by the diffusion of oxygen anions in the lattice to the surface, the surface oxygen vacancies formed by dehydration reaction can diffuse into the bulk structure of anatase particles to propagate reduction. ii) Another possible propagation mechanism can be described with the diffusion of hydrogen molecules into the lattice. Because molecular hydrogen can dissociates on TiO$_2$ surfaces possessing vacancy sites, it is also possible that the propagation of reduction could be induced by diffusion of hydrogen into the lattice. Atomic hydrogen could diffuse into the bulk, reacting with lattice oxygen to produce hydroxyl in the lattice. The hydroxyl could diffuse towards the surface followed by desorption from the surface as water molecules.

The underlying thermodynamics and effect chemistry will now be described. The reduction of TiO$_2$ anatase at low oxygen partial pressures (here, under 5% H$_2$/Ar atmosphere) can be described by different intrinsic defect types (Schottky or Frenkel). It was reported that Schottky disorder was predominant at low temperature (below 580° C.), which is related to our typical experimental condition, see reference 28. For predominant Schottky defects, the reduction reaction can be described as

(1)

As shown in Eqn. 1, excessive electrons are generated to compensate Schottky defects. The equilibrium constant K for the reaction is given by

(2)

The intrinsic Schottky equilibrium of the oxide, TiO$_2$ is given by the following reaction:

(3)

The equilibrium constant K$_s$ for eq. 3 is

(4)

The equations describing the intrinsic electronic equilibrium and its equilibrium constant $K_i$ are as follows:

$$nil = h^\cdot + e' \tag{5}$$

$$K_i = np \tag{6}$$

From these equations, the electroneutrality condition is given as $$n + 4[V''''_{Ti}] = p + [V_O^{\cdot\cdot}] \tag{7}$$

In the low oxygen partial pressure region under 5% $H_2/Ar$ atmosphere (calculated $P_{O_2} \sim 2.6 \times 10^{-35}$ at 400° C.), as the oxygen pressure decrease, the concentration of oxygen ion vacancy will increase. This increase causes the metal vacancy concentration to decrease. In this situation, $$[V_O^{\cdot\cdot}] \gg [V''''_{Ti}] \tag{8}$$

Thus, n must increase to main the electroneutrality condition, and accordingly, p must decrease. In this case, the electroneutrality condition given in Eq. 7. is reduced to $$n = 2[V_O^{\cdot\cdot}] \tag{9}$$

From Eqs. 2 and 9, the oxygen partial pressure dependence of electron concentration is obtained as $$n = \left(\frac{K}{2}\right)^{1/3} P_{O_2}^{-1/6}$$

It was reported that the conductivity can be expressed by $P_{O_2}^{-1/6}$-dependent electronic (Ge) conductivity in the low-$Po_2$ region below 580° C. This shows that Schottky disorder is predominant in $TiO_2$ anatase of our experimental condition (highly reducible condition at $P_{O_2} \sim 2.6 \times 10^{-35}$ at 400° C.). The structural characterization of the materials will now be described. To determine the phase contents, lattice parameters and particle sizes, pristine-, annealed- (under Ar), and reduced- (under 5% $H_2/Ar$) $TiO_{2-\delta}$ nanocrystalline samples were examined by powder X-ray diffraction (XRD) as shown in FIG. 1. The XRD pattern of the pristine $TiO_2$ (bottom curve in FIG. 1) exhibits typical peaks of anatase phase with a space group of $I4_1/amd$ (JCPDS, No. 21-1272). Both Ar-annealed and $H_2$-reduced nanoparticles for 1 h show nearly the identical peak patterns with that of pristine sample, indicating no phase transition was occurred to other phases i.e. rutile. As the size of particles used in the typical experiment is beyond 20 nm, the thermal treatment was limited to perform at relatively low temperature of 400° C., which is lower than normal phase transition (to rutile) temperature of 650° C. in order to avoid not only size-induced phase transition but also significant grain growth which may perturb ultimate electrochemical lithium storage performances. Small grain size, especially nanometer size regime gives rise to high free surface energy, allowing both grain growth at much lower temperature than that for submicron/micron sized materials and early phase transition. See reference 25. Crystallite sizes were determined by whole powder pattern decomposition method. During the thermal annealing process for 1 h, crystallite size of pristine $TiO_2$ (17±3 nm) was slightly increased to 29±5 nm for both Ar-annealed and $H_2$-reduced samples showing comparable increase in particle size. In this temperature range, the isothermal grain growth of anatase $TiO_2$ nanocrystals was reported to limitedly occur below 40 nm, see reference 26.

The XRD pattern of reduced $TiO_{2-\delta}$ under 5% $H_2/Ar$ for 7 hours still shows well-defined peaks for the anatase crystal structure without any phase transition to rutile. At the low temperature (here 400° C.), fluctuations of Ti and O atoms in anatase are not strong enough to generate rutile nuclei on the surface or in the bulk even for longer time period of the annealing process. The grain growth kinetics of nano-sized anatase particles was reported to follow the equation below with a time exponent m=0.286(±9) and an activation energy of $Ea=32\pm2$ kJ·mol$^{-1}$, where t is annealing time, D is particle size, and Do is initial particle size, See reference 27.

$$D^2 - D_0^2 = k_0 t^m e^{(-E_a/RT)}$$

Thus the isothermal grain growth (depending on annealing time) usually occurs with much slower kinetics than temperature-dependent grain growth kinetics. The grain size of the $H_2$-reduced particles (for 7 h) exhibited nearly the identical size of ~30±5 nm with the sample reduced only for an hour at the same temperature. The grain growth was found to be almost negligible for the H2-reduced sample for 7 h, indicating the annealing time in this temperature range does not play a significant role in growing grains.

The physicochemical parameters for example, Brunauer-Emmett-Teller (BET) surface area, total pore volume, and average pore radius are summarized in table 2. A Similar tendency with the XRD results of the morphological changes during the annealing and reducing processes in different gas contents were further observed by nitrogen adsorption and desorption isotherms. The BET surface area of pristine $TiO_2$ nanocrystalline powders is measured as 174 m$^2$/g. Upon the annealing processes at different gas atmosphere, the BET surface area was slightly decreased, showing 161 and 154 m$^2$/g for Ar-annealed and $H_2$-reduced powders, respectively. However, the values of the surface area were preserved as increase of annealing time to 7 hours, as the variation of particle sizes exhibited a comparable tendency. The behavior of variation in average pore radius and total pore volume were shown to be analogous to that of specific surface area. The maintenance in the physicochemical parameters including type of isotherms during the annealing and reducing processes again confirms that significant structural changes do not take place at the selected temperature of 400° C.

To achieve an excellent rate performance of lithium batteries, both lithium ionic and electronic diffusion should be considered together. Several factors have been reported to mainly affect the rate performance of mixed conductive electrode materials i.e. $TiO_2$, in which diffusion of both lithium ions and electrons is necessary. This includes not only materials intrinsic properties such as lithium ionic/electronic conductivity which are related to diffusion coefficient (D), extrinsic properties which are related to diffusion length (L) mainly being affected by morphological factors such as particle size including particle size distribution (see references 7 and 29) particle connectivity (see reference 30) and phase transition kinetics (for particular materials exhibiting the phase transition step during lithium insertion/extraction reaction (see reference 31). In the samples considered here it is assumed that those factors mentioned above also co-exist to affect electrochemical lithium storage performances in combination. Thus we tried to distinguish those factors to clarify the limiting parameter for the ultimate lithium storage performance. To study rate performances, as shown in FIG. 7, pristine, Ar-annealed, and 5% $H_2/Ar$-reduced $TiO_{2-\delta}$ samples were started to charge/discharge at current density of 0.2 C (67.2 mAh/g) upto 3° C. (10.08 Ah/g). A rate of nC denotes a Li-insertion/extraction in 1/nh. Unsurprisingly, at 0.2 C rate, the nano-sized pristine anatase $TiO_2$ without further treatments exhibited high initial discharge capacity of 234 mAh/g but showed the sharp decay in 20 cycles (64 mAh/g at 20$^{th}$ cycle). At the same C rate, the annealing process only under Ar atmosphere revealed to be effective in enhancing capacity, showing almost two times higher initial discharge capacity (347 mAh/g) for the thermally-annealed sample though its larger particle size due to the grain growth. Moreover, capacity retention (Cap. Ret.) of Ar-annealed sample after performing 100 cycles was also improved to 43%. This capacity retention is not practically high, but considerably enhanced value, compared with very poor capacity retention for the pristine sample of only 27%. However, those two samples showed practically negligible lithium insertion/extraction capability at high C rates over 10 C. However, it is worthy to note that excellent rate capability was obtained for the $H_2$-reduced sample (for 1 h, slightly-reduced $TiO_{2-\delta}$), maintaining its discharge capacity of 60 mAh/g at relatively high C rates over 10 C, as FIG. 6 shows. Because the improvement of rate performance was observed both Ar-annealed and $H_2$-reduced sample, we were motivated to distinguish effects of thermal treatment and hydrogen reduction on the electrochemical lithium storage performance. To distinguish those two effects, a Li-insertion/extraction reaction of those samples was performed at one particular rate of 1 C (one lithium per formula unit in 1 hour) for 100 cycles, as shown in FIG. 6. A similar trend of lithium storage performance has been noticed for those three samples, in which the Hz-reduced $TiO_{2-\delta}$ sample displays the best discharge capacity (131 mAh/g) with Cap. Ret. of ~43% after 100 cycles. On the other hand, discharge capacity of pristine, Ar-annealed sample was 91 (Cap. Ret. ~34%), and 41 in mAh/g (Cap. Ret. ~21%), respectively. Hence, the value of the capacity enhancement by thermal reduction process was 90 mAh/g in total. It is interesting to indicate that 50 mAh/g (56%) of capacity was enhanced by simple thermal treatment, whereas 40 mAh/g (44%) of enhancement was induced by hydrogen reduction which could generate excessive electrons in the structure. Contributions of the thermal treatment and hydrogen reduction to capacity enhancement is almost comparable at 1 C (56 and 44% respectively), whereas hydrogen reduction leads only to 28% of capacity enhancement at 0.2 C.

From the results obtained, therefore, it is clear that thermal annealing process is also capable of improving lithium storage capacity, especially at low rates. The resulting improvement of both capacity and capacity retention in thermally annealed $TiO_2$ can be explained by either its more compact morphology or better crystallinity than that of non-annealed one. As FIG. 2 (SEM image) shows, thermal annealing could make particle morphology dense, thus provide better electronic contacts between particles than that of non-annealed particles, which is considerably advantageous to obtain high storage performance. Nevertheless anatase $TiO_2$ does not severely suffer from the volumetric changes during continuous charge/discharge, reduced volume changes resulting from the better particle connectivity can be one of the possible reason for the improved capacity retention.

With the annealing process in 5% $H_2$/Ar gas mixture, two different samples were prepared under almost the same experimental condition, except only annealing time (1 h, 7 h). As mentioned in the electronic conductivity section, those samples were named as 'slightly-reduced $TiO_{2-\delta}$' (sr-$TiO_{2-\delta}$) for the sample reduced for 1 h and 'heavily-reduced $TiO_{2-\delta}$' (hr-$TiO_{2-\delta}$) for sample undergone for 7 h, respectively according to extent of conductivity enhancement in the pristine $TiO_2$ (assumed as a stoichiometric sample). FIGS. 5a and 5b show galvanostatic charge/discharge curves of sr-$TiO_{2-\delta}$ and hr-$TiO_{2-\delta}$ electrodes cycled at 0.2 C. First of all, the electrode polarization of sr-$TiO_{2-\delta}$ cell was measured as 100 mV which is notably decreased value by 34% as compared to that of pristine $TiO_2$ electrode (150 mV), while only 7% of decrease (140 mV) has shown in hr-$TiO_{2-\delta}$. Based on discharge curves, both curves depict typical lithium-insertion behavior of nanocrystalline anatase $TiO_2$, showing three different insertion mechanisms. The region A, where initial monotonous potential decrease occurs before the plateau at ~1.78 V ($Li^+$/Li) is attributed to storage mechanism by forming solid solution (see reference 32). As shown in FIG. 5a, region A of the first discharge curve of sr-$TiO_{2-\delta}$ displays abnormal semi-plateau starting from ~2.5 V which contribute to deliver larger proportion of capacity (17%, corresponding to 0.17 mol Li) than that of hr-$TiO_{2-\delta}$ (12%, corresponding to 0.09 mol Li). Upon continuous Li-insertion/extraction up to 20 cycles, the proportion of capacity related to region A decreases to 9~10%. Nevertheless, delivered capacities by region A of sr-$TiO_{2-\delta}$ are larger than that of hr-$TiO_{2-\delta}$ particles for all cycles. Since the solid solution domain is correlated to surface states of the particles, it gives rise to irreversible capacity at a first cycle due to the formation of solid electrolyte interfaces (SEI) between electrolyte and active materials (see reference 33). Therefore, the extended region A might be due to particularly modified surface (defects) structure of sr-$TiO_{2-\delta}$. However, since the semi-plateau was not obtained in the case of hr-$TiO_{2-\delta}$, it is hard to explain details of the differently modified surface structures in this report. A further study is now in progress to investigate correlation of different surface (defects) structures depending on the reducing condition in conjunction with their electrochemical lithium storage properties. The region B, corresponding to the horizontal plateau at ~1.78V ($Li^+$/Li) ascribes to lithium storage mechanism by intercalation into interstitial octahedral sites of the bulk anatase $TiO_2$ in which phase transitions occurs from tetragonal (anatase $TiO_2$) to orthorhombic ($Li_xTiO_2$) phase. At initial cycles, region B was found to be the main storage proportion in both reduced samples, exhibiting ca. 40~55% of overall capacity. In region C (potential range between 1.78 and 1.0V (Li+/Li)), even after all available octahedral sites for bulk storage are consumed, lithium ions can further stored at surface of anatase particles. Both sr-$TiO_2$-sand hr-$TiO_{2-\delta}$ do not show any significant difference in the proportion of region C, capturing 36~48% of total capacity. The proportions of region C in both samples increase as a function of cycle number. Because all the lithiated-$TiO_2$ particles cannot be restored back to the initial state during lithium extraction process, lithium intercalation reaction is not fully reversible. Therefore available octahedral sites for Li-intercalation reaction must be diminished upon continuous cycling with the kinetically irreversible $Li_{x-}$ $TiO_2$ phase, resulting in the fact that not only capacity fading occurs but also the proportion of the stored lithium at particle surfaces (region C) could be getting increased compared to that of region B. Furthermore as FIG. 5b shows, sr- and hr-$TiO_{2-\delta}$ electrodes were charged/discharged at constant 1 C and ten times higher current rate of 10 C totally for 100 cycles. Corresponded discharge capacities and capacity retentions were summarized in Table 3 of FIG. 10. At 1 C, both nonstoichiometric sr- and hr-$TiO_{2-\delta}$ anatase particles could deliver reversible lithium insertion/extraction capacities over 100 mAh/g. Unexpectedly, despite 1.3 order of lower electronic conductivity than that of the hr-$TiO_{2-\delta}$ active material, the lithium storage behavior of the sr-$TiO_{2-\delta}$ particles was significantly superior, exhibiting excellent capacity with capacity retention. More interestingly, at much faster lithium insertion/extraction reaction condition, 10 C, a capacity reduction was not observed in case of sr-$TiO_{2-\delta}$, keeping deliver nearly the identical reversible capacity of 130 mAh/g even after 100 cycles. On the other hand, the 38% capacity reduction than 1 C was occurred for hr-$TiO_{2-\delta}$ sample, cycled at 10 C. This indicates that in this particular experimental condition, electronic conductivity could not play a main role for obtaining good storage performances. The excellent rate capability of the sr-TiO$_{2-\delta}$ is evidently shown in FIG. 6.

Although the thermal annealing process contributes to enhance discharge capacities in the Ar-annealed samples, linear decrease of the capacity was observed upon increasing the constant current density. For sr-TiO$_{2-\delta}$, on the other hand, the increase of the constant current rate from 67.2 mA/g to 3.36 A/g (fifty times higher) reduces discharge capacity by only 28% which shows almost the identical capacity of 130 mA/g at 1° C. with that at 1 C (131 mAh/g).

To clarify the different rate capability between sr-TiO$_{2-\delta}$ and hr-TiO$_{2-\delta}$, electronic conductivity should be considered in conjunction with other parameters which are related to lithium storage properties. One possible explanation of the better electrochemical properties of sr-TiO$_{2-\delta}$ compared to hr-TiO$_{2-\delta}$ can be proposed by using the ambipolar diffusion concept of electrons and lithium ions in TiO$_2$ with following equation.

$$D_{Li,chem} \propto \frac{D_{e^-} \cdot D_{Li^+}}{D_{e^-} + D_{Li^+}}$$

where $D_{e^-}$ and $D_{Li^+}$ are the diffusion coefficient of electrons and lithium ions, respectively. Based on the equation, a total chemical diffusion of lithium needs to consider both transport of electrons and lithium ions. Among electrons and ions, if a transport of particular species is substantially slow, total ambipolar diffusion of lithium should be sluggish. If we extrapolate a electronic conductivity at room temperature (a real operating temperature of Li-insertion/extraction reactions) from the DC-conductivity result (FIG. 3), the conductivity of sr-TiO$_{2-\delta}$ is 1.0×10$^{-3}$ S/cm, whereas hr-TiO$_{2-\delta}$ showed higher value of 5×10$^{-2}$ S/cm. However, the measured electrochemical storage performances are in reverse with the electronic conductivity result. This indicates that the poor electrochemical performances in hr-TiO$_{2-\delta}$ might be attributed to poor diffusion of lithium ions rather electrons. In this study, different nature and/or concentration of intrinsic defects may play a main role to decide the diffusion of lithium ions. The most favorable locations for the migration of the inserted lithium ions are known as octahedral holes in which the lithium is surrounded by six oxygen atoms, following a zigzag route from one octahedral hole to the next, crossing a saddle point halfway between the octahedral holes. Thus, created defects not only at the particle surfaces but also in the bulk crystals are expected to manipulate the behavior of lithium insertion and migration. Indeed, delocalized excessive electrons generated during the hydrogen reduction could reduce Ti$^{4+}$ ions in the lattice to Ti$^{3+}$. And Ti$^{3+}$—Li$^+$ defect clusters are reported to stably be formed with a relatively small binding energy of ~0.5 eV. Therefore, the location and electrostatic effect of the both isolated charged Ti$^{3+}$ defects [Ti$_{Ti}^{\cdot}$] might affect the behavior of Li$^+$ in anatase crystal structures, in which the ability of Li$^+$ ions to intercalate and diffuse could be changed in the defective bulk structure of nanocrystalline anatase particles depending on the nature of the defects including a type and concentration (see reference 34). Hence, regardless of the higher electronic conductivity, the excessively too much defects throughout the whole bulk structure of hr-TiO$_{2-\delta}$ that might hinder from freely inserting and migrating lithium ions and negatively affect in phase transition kinetics seem to be a limiting factor of electrochemical performances. On the contrary, the sr-TiO$_{2-\delta}$, which has reduced (oxygen deficient) domain only at particle surfaces could achieve excellent chemical diffusion of lithium with the aid of the enhanced electronic conductivity without severely destroying bulk crystal structure. This allows that sr-TiO$_{2-\delta}$ (surface-reduced) particles have a superior ambipolar diffusion and finally results in excellent electrochemical lithium storage capacity. As a conclusion it can be stated that changes in the electronic conductivity by dealing intrinsic defects performed by hydrogen thermal treatment were investigated to understand how the strategy affects the electrochemical lithium storage performances. Two different samples (slightly- and heavily-reduced anatase TiO$_{2-\delta}$ nanoparticles) were prepared depending on the extent of reduction by controlling reduction time factor. The reduced anatase TiO$_{2-\delta}$ particles showed significantly enhanced lithium storage performances such as capacity and rate performances when compared with pristine and Ar (thermally)-annealed TiO$_2$ active materials. Moreover, we have observed the phenomena that despite its lower electronic conductivity the slightly-reduced anatase TiO$_{2-\delta}$ active material shows the higher capacity as well as better rate capability including smaller electrode polarization as compared to those of heavily-reduced TiO$_{2-\delta}$ particles. We carefully conclude that the better electrochemical performances of slightly-reduced TiO$_{2-\delta}$ particles may arise from balanced electronic and lithium ionic transports. From the best of our knowledge, it is mostly reasonable to describe the different lithium ion transport behaviors in two differently reduced samples with the concept of different surface and/or bulk defect structures. A further study confirming the idea is in progress by using electrochemical impedance spectroscopy (EIS) and galvanostatic intermittent titration technique (GITT) in order to investigate each contribution of $D_{e^-}$ and $D_{Li^+}$ to battery performances. Our study proposes a relatively simple but very effective approach to prepared excellent lithium storage materials by dealing intrinsic defect sites at particle surfaces without hampering lithium intercalation reaction in oxides that is applicable to other oxide-based electrode materials for high performance lithium-batteries as well as dye-sensitized solar cells.

In a typical preparation of material in accordance with the present teaching the anatase phase of TiO$_2$ nanopowders (~50 nm (MTI Co., USA) is used. In the typical experiment, this as-received sample was—without further treatments—a stoichiometric anatase TiO2.

H$_2$-treatment of TiO$_2$: The nonstoichiometric TiO$_{2-\delta}$ was prepared by using 5% H$_2$/Ar gas mixture. In typical processes, the nano-sized commercial TiO$_2$ with the particle size of ca. 50 nm was put in a cylindrical electric furnace, and firstly underwent a pre-treatment at 300° C. to remove impurities under pure Ar for 30 min. After completely cooling down to room temperature, the pre-treated sample was again heated up to 400° C. under pure Ar at a gradient rate of 10° C.·min$^{-1}$. The Ar flow rate was fixed as 20 ml·min$^{-1}$. Subsequently, the 5% H$_2$/Ar gas mixture was introduced with the flow rate of 18 ml·min$^{-1}$ when the temperature was in stable condition at 400° C. and further treated for 1 h or 7 h to prepare two different samples, slightly-reduced TiO$_{2-\delta}$ (sr-TiO$_{2-\delta}$) and heavily-reduced TiO$_2$ (hr-TiO$_{2-\delta}$). The gas was deliberately switched again to pure Ar after H$_2$-reduction process descending temperature to room temperature with the same gradient rate of 10° C.·min$^{-1}$. The reduced-TiO$_{2-\delta}$ sample was taken out from the electric furnace when the sample was totally cooled down to room temperature in order to avoid a possibility of re-oxidation at higher temperature. The heat treatment is summarised in FIG. 8.

For DC conductivity measurements, anatase powders were pressed to produce pellets of about 5 mm thickness and 10 mm diameter. The density of the pellet was determined from mass and geometrical dimensions. Thin film of Au as the electrode was sputtered on both sides of the pellets. The electrical conductivities of $TiO_2$ were measured as a function of temperature and oxygen partial pressure ($Po_2$) using two-probe d.c. method. D.c. conductivity was measured by using current source and voltmeter (Model, USA). The temperature dependence of conductivity was measured between 200 and 400° C. at 50° C. steps in dry air and $H_2$—Ar mixtures for low $Po_2$ atmospheres, respectively.

Electrochemical characterization of the material was carried out as follows: The two-electrode Swagelok-type™ lithium half cells were fabricated in Ar-filled glove-box to test electrochemical properties of $H_2$-reduced and pristine $TiO_2$ sample. To prepare working electrodes, a homogeneous mixture of active material, carbon black (conductive additives), and solution of poly (vinyl difluoride) (PVDF) in N-methyl-2-pyrrolidone (NMP) was used at a ratio of 80:10:10 in weight. It should be noted that the use of carbon black or an additive to enhance electronic conductivity is not essential. For example a mixture of 90% by weight of active material (treated $TiO_2$ powder) and 10% binder can be used and the proportion of active material to binder can also be varied. Equally the amount of a conductive addition of carbon black can be varied and proportionately more or less binder can be used. Also other binders well known in the art can be used. One advantage of the above described binders and other organic binders is that on roasting the mixture to form the electrode material the binder can be reduced to form of carbon and also preserves the desired porosity (voids) in the structure to achieve the desired porosity. The mixture was uniformly pasted on Cu-foil of 0.025 mm in thickness (99.9%, Goodfellow) followed by drying process under vacuum overnight. Thereafter, the dried Cu-foil was punched in a diameter of 10 mm. Pure lithium metal (Aldrich) as counter electrode, glass fiber textile (Whatman) as separator and the working electrode were mounted in sequence. A liquid electrolyte of 1 M LiPF6 in ethylene carbonate (EC)/dimethyl carbonate (DMC) (1:1, in volume) (Ube Industries Ltd.) was dropped to sufficiently wet the electrode. Electrochemical lithium insertion/extraction reactions were performed by an Arbin MSTAT system at different discharge/charge rates.

FIG. 1 shows X-ray diffraction (XRD) patterns of pristine $TiO_2$ (bottom curve), Ar annealed $TiO_2$ ($2^{nd}$ from bottom curve), sr-$TiO_{2-\delta}$ (3nd from top curve) and hr-$TiO_{2-\delta}$ (top curve) respectively. The respective intensity for each phase has been normalized for reasons of comparison. Since the positions of the different intensity maxima remain unchanged after $H_2$ treatment these curves indicate that no phase change from anatase phase takes place after the H2 treatment.

FIGS. 2a-d show SEM images of various $TiO_2$ phases. In particular FIGS. 2a-d indicate the particle morphology of pristine $TiO_2$, Ar-annealed-$TiO_2$, and sr-$TiO_{2-\delta}$, and an $H_2$-7 h-$TiO_{2-\delta}$ sample. The pristine $TiO_2$ nanoparticles have relatively loose morphology, whereas that of the thermally annealed materials (both under pure Ar and 5% $H_2$/95% Ar mixture, FIG. 2b-d) tend to be closely packed. The denser particle interconnectivity induced by thermal annealing can give rise to better electronic contacts between anatase particles than that of non-annealed materials, which is advantageous to obtain better electrode performance. The electronic conductivity is still limited to the bulk value of the anatase. $H_2$-thermal treatment effectively increases the bulk value of electronic conductivity when compared to the Ar-annealing and thus not only yields a capacity enhancement at low C rates, but also improves storage kinetics at high C rates.

It has also been found that changes of morphology are almost negligible as a function of the annealing time at the given temperature (723 K) except for the small change of the overall particle interconnectivity induced by the thermal annealing (FIGS. 2a-d). The better lithium storage properties of thermally treated $TiO_2$, e.g. Ar-annealed 1 h-$TiO_2$ compared with the pristine material can be explained by its more dense electrode morphology with better crystallinity particularly at particle surfaces resulting from the thermal annealing process.

FIG. 3a shows the DC-conductivity of anatase $TiO_2$ during the reduction experiment for different $H_2$-treatment times, as the reduction time increases so does the DC-conductivity. FIGS. 3b and 3c show heating and cooling curves of $TiO_2$ before and after treatment of the $TiO_2$ in $H_2$/Ar indicating that the conduction mechanism of the anatase $TiO_2$ is very similar before and after $H_2$-treatment.

FIGS. 4a and 4b show the rate capability of corresponding electrodes of pristine $TiO_2$, sr-$TiO_{2-\delta}$, and Ar-annealed $TiO_2$ (filled-point: discharge capacity, open-point: charge capacity) charged/discharged with current densities starting from 67.2 mA·$g^{-1}$ (0.2 C) up to 10.1 A·$g^{-1}$ (30 C). At 0.2 C rate, the pristine $TiO_2$ exhibited high initial discharge capacity (234 mA·$g^{-1}$) followed, however, by the sharp capacity decay in further 20 cycles. At the same C rate, Ar-annealed-$TiO_2$ electrode shows remarkably enhanced initial discharge capacity (350 mAh·$g^{-1}$). However, these two materials showed practically negligible lithium insertion/extraction capability at C rates of over 10 C. The excellent rate capability was obtained only for the sr-$TiO_{2-\delta}$ electrode, delivering a discharge capacity of 60 mAh·$g^{-1}$ even at 10 C, as shown in FIG. 4b.

The Li-storage performance of sr-$TiO_{2-\delta}$ and Ar-annealed-$TiO_2$ nanoparticles is compared in FIG. 4b and Table 1. The electrodes were charged/discharged for 100 cycles at a constant current density of 1 C (0.336 A·$g^{-1}$). Both oxygen-nonstoichiometric sr-$TiO_{2-\delta}$ and Ar-annealed $TiO_2$ electrodes delivered higher capacities than those for the pristine, stoichiometric $TiO_2$ electrode. However, it is interesting to note that despite the lower bulk electronic conductivity, the discharge capacity of the sr-$TiO_{2-\delta}$ at 1 C (131 mAh·$g^{-1}$) was notably higher than that of the Ar-annealed-$TiO_2$ (91 mAh·$g^{-1}$). Even more interestingly, under ten times faster lithium insertion/extraction reaction condition (10 C), a capacity decay was not observed in the sr-$TiO_{2-\delta}$ electrode, maintaining nearly the same reversible capacity (130 mAh·$g^{-1}$, $100^{th}$ cycle), while the Ar-annealed $TiO_2$ electrode lost 38% of its discharge capacity delivered at 1 C.

FIGS. 5a and 5b show different Galvanostatic charge/discharge profiles for different anatase $TiO_2$ for different $H_2$ treatment times. In particular FIG. 5a shows sr-$TiO_{2-\delta}$ cycled for different C and FIG. 5b shows hr-$TiO_{2-\delta}$ cycled for different C. FIG. 5c shows the corresponding discharge capacity proportions of region A (solid solution domains), region B (lithium intercalations) and region C (surface storages) of sr-$TiO_{2-\delta}$.

FIGS. 6a-b show the variation of charge and discharge capacity versus cycle number for sr-$TiO_{2-\delta}$ (discharge □, charge ■), hr-$TiO_{2-\delta}$ (discharge ○, charge •), and pristine $TiO_2$ (discharge ▲, charge △) cycled at constant current rate of a) 1 C (336 mA·$g^{-1}$) and b) 10 C (3.36 A·$g^{-1}$). FIG. 6c shows the current density dependency of the discharge capacity for differently-treated anatase $TiO_2$ nanoparticles. In particular the excellent rate capability of the sr-$TiO_{2-\delta}$ is illustrated in FIG. 6c.

FIG. 7 shows a schematic of a proposed lithium storage mechanism in surface oxygen-nonstoichiometric TiO$_{2-\delta}$ networks via H$_2$-thermal treatment. In particular one can see how Li+ ions could be inserted, i.e. diffuse into the TiO$_2$ during operation.

FIG. 8 shows a schematic of the experimental procedure carried out to prepare H$_2$-thermal treated anatase TiO$_{2-\delta}$ nanocrystalline. In this example anatase nanoparticles were treated under 5% H$_2$/95% Ar mixture at a temperature of 400° C. for 60 minutes following a 30 min long step of pre-treatment in an Ar atmosphere at a temperature of 250° C. The step of pre-treatment can naturally be carried out for a period in the range of 1 second to 1 hour, preferably in the range of 20 minutes to 40 minutes. The step of pre-treatment can also be carried out in a temperature range of from 50° C. to 400° C., preferably of from 150° C. to 300° C.

FIG. 9 shows a hierarchical nanoporous TiO$_2$ structure which was successfully prepared by a simple in-situ hydrolysis method. Used as an anode material, the TiO$_2$ achieves sustained high lithium-storage performance especially at high charge/discharge rates due to its sufficiently high surface area which facilitates the Li$^+$ diffusion. The material shows two different major storage modes, a) bulk intercalation, and b) pseudo-capacitive interfacial storage which is responsible for 64% of the total capacity. In order to kinetically emphasize the interfacial storage even further, the material was directly cycled at high rates, resulting in 302 mAhg$^{-1}$ and 200 mAhg$^{-1}$ of fully reversible discharge capacity at charge/discharge rate of 1 C and 5 C with very high cycle stability.

FIG. 10 shows the formation of mixed conducting networks (e$^-$/Li$^+$) which is necessary for excellent Li-storage performance. As shown in both figures, ionic wiring can be successfully achieved by using hierarchically porous electrochemically active materials. On the other hand, the conventional method for electronic wiring is either coating the material with carbon or adding secondary conducting phases for example RuO$_2$ or Ag nanoparticles (top figure). However, as the lower figure indicates the method of obtaining efficient electronic wiring is the direct reduction of the electrochemically active particles without using secondary phases. This method is beneficial to the volumetric energy density of Li-battery electrodes.

Figure 1:
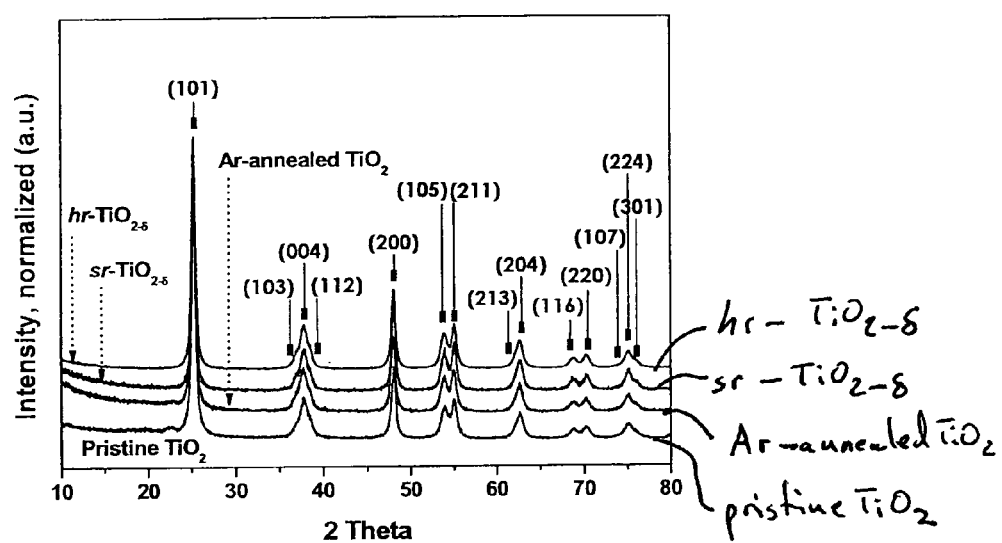
Figure 2:
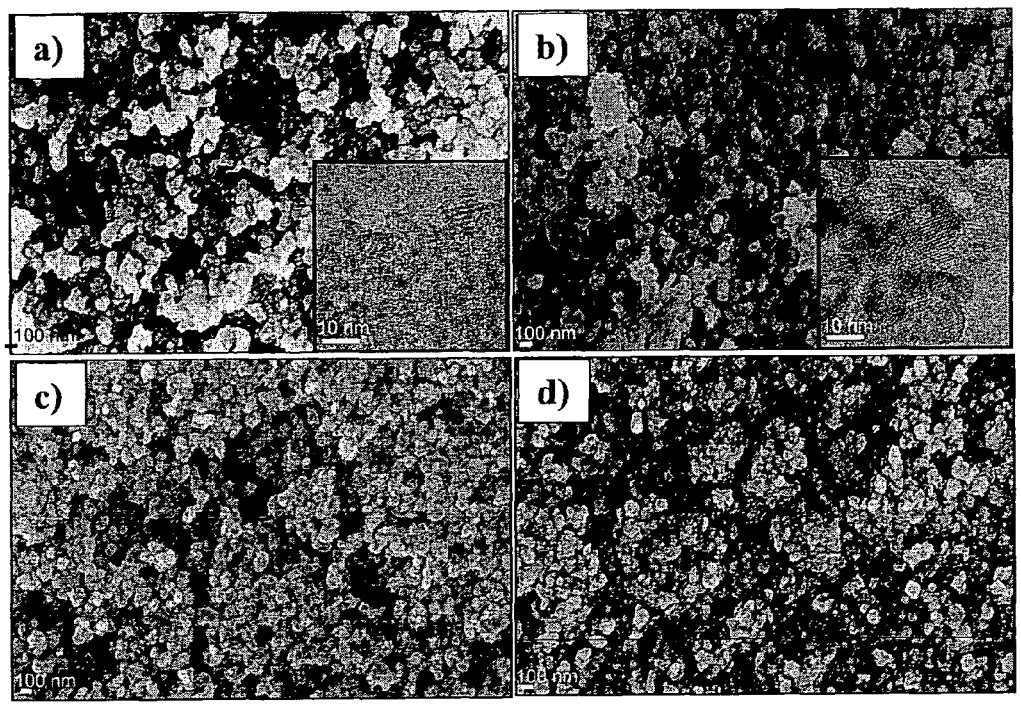
Figure 3:
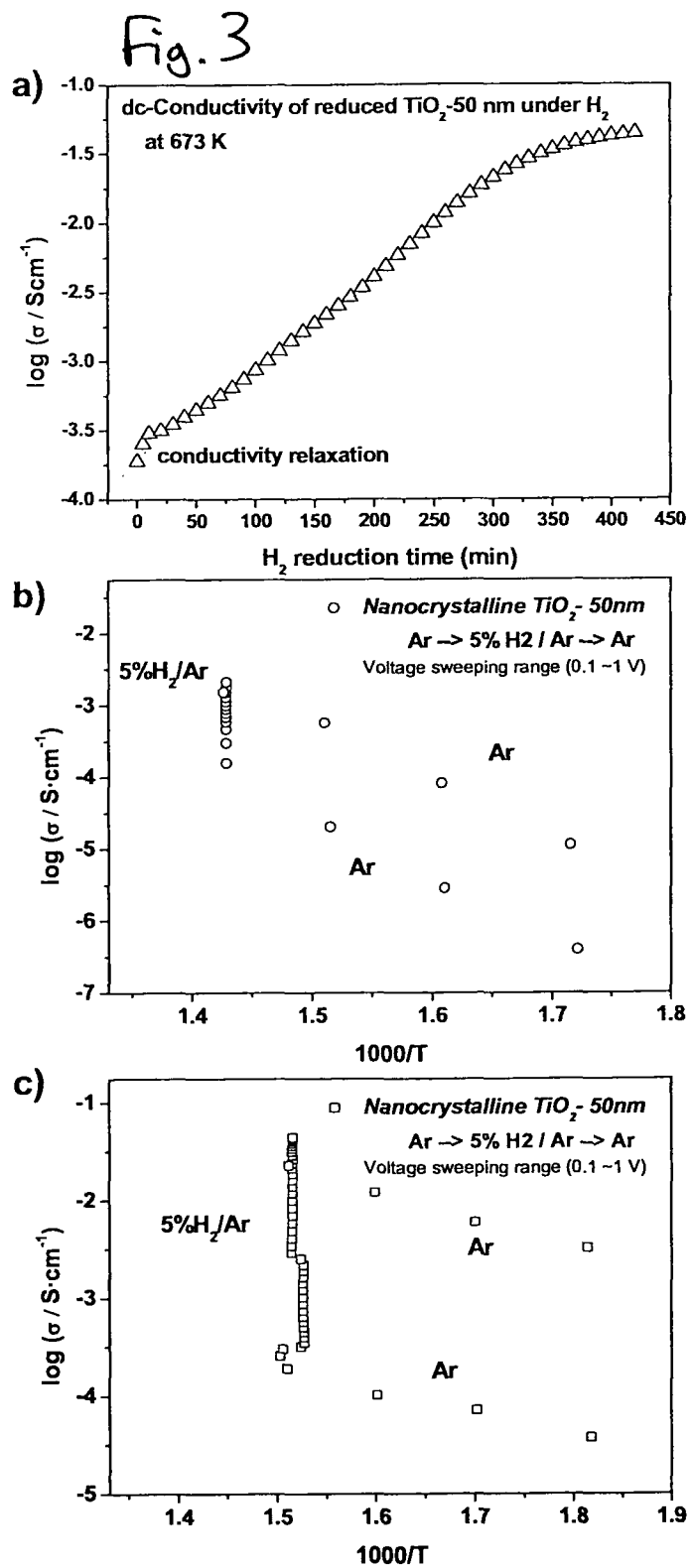
Figure 4:
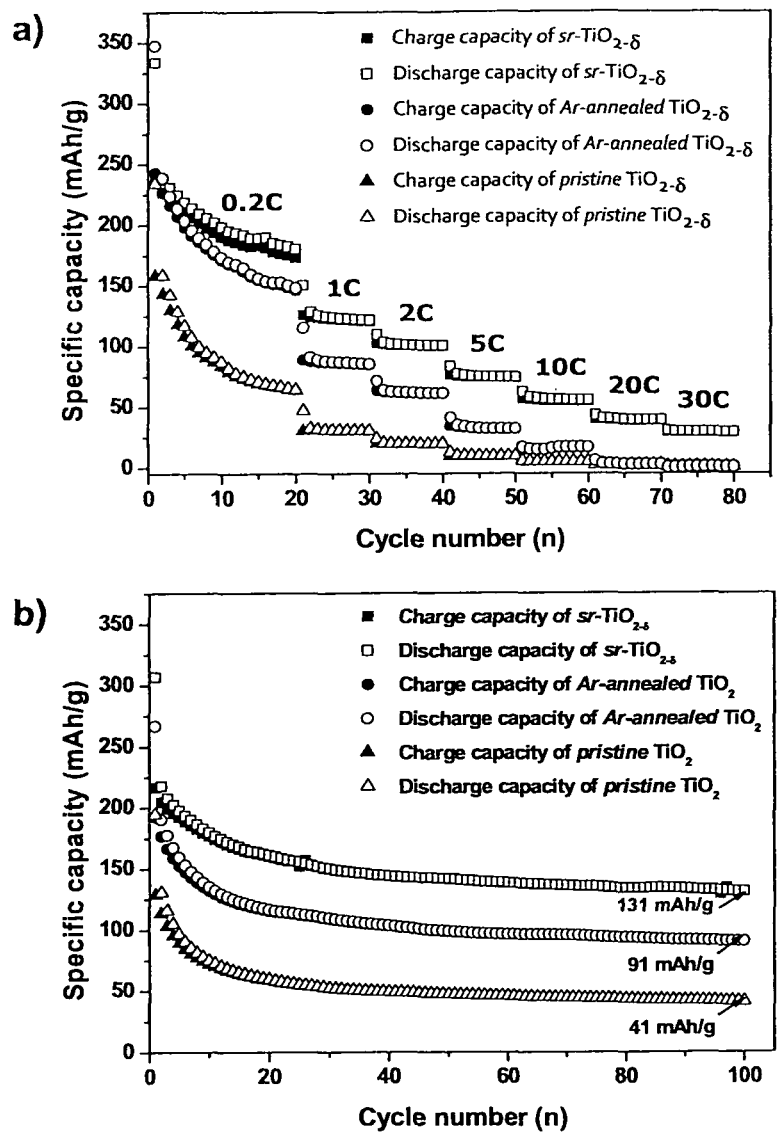
Figure 5:
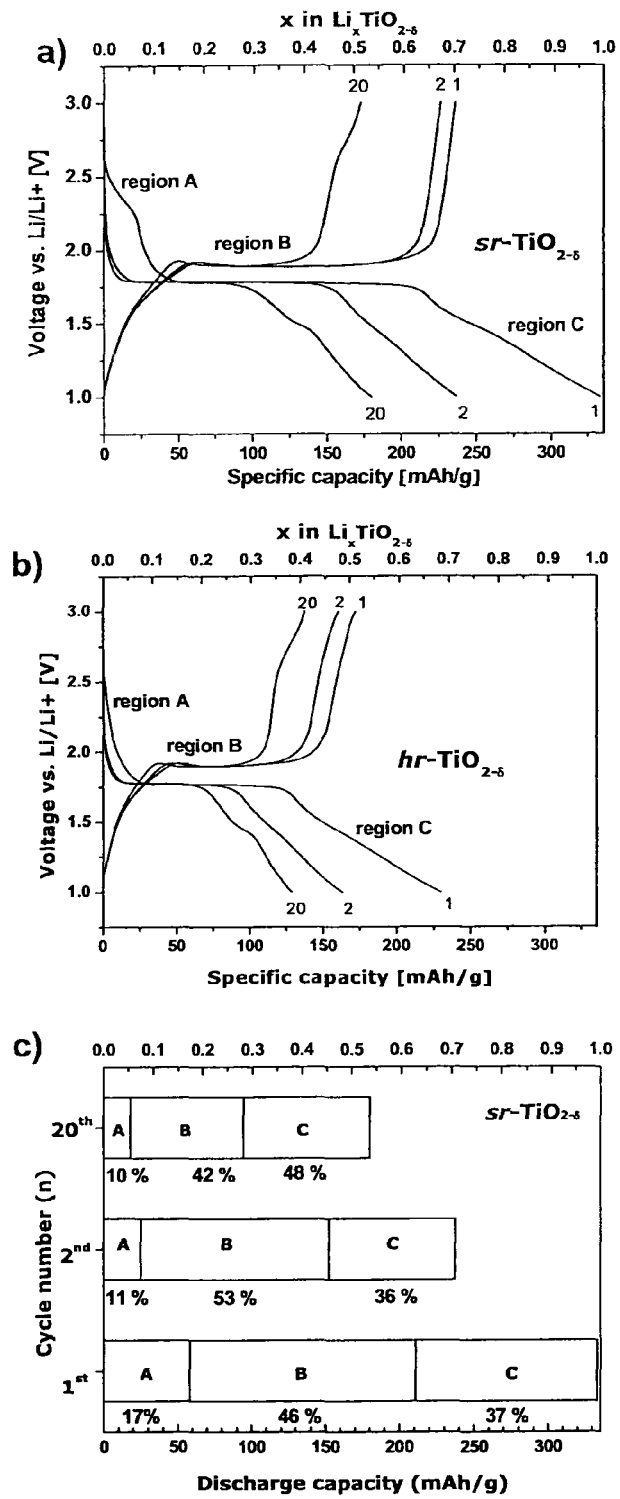
Figure 6:
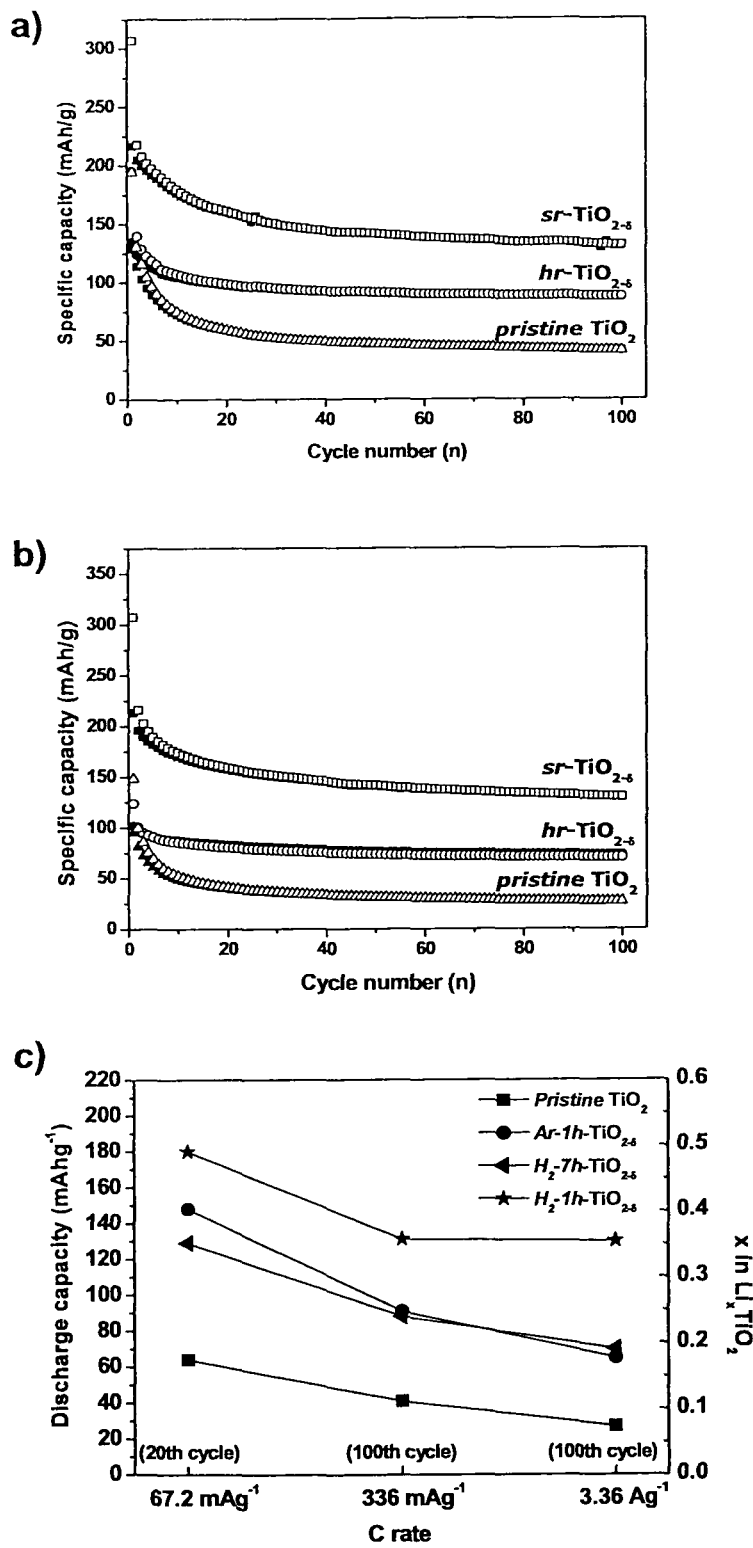
Figure 7:
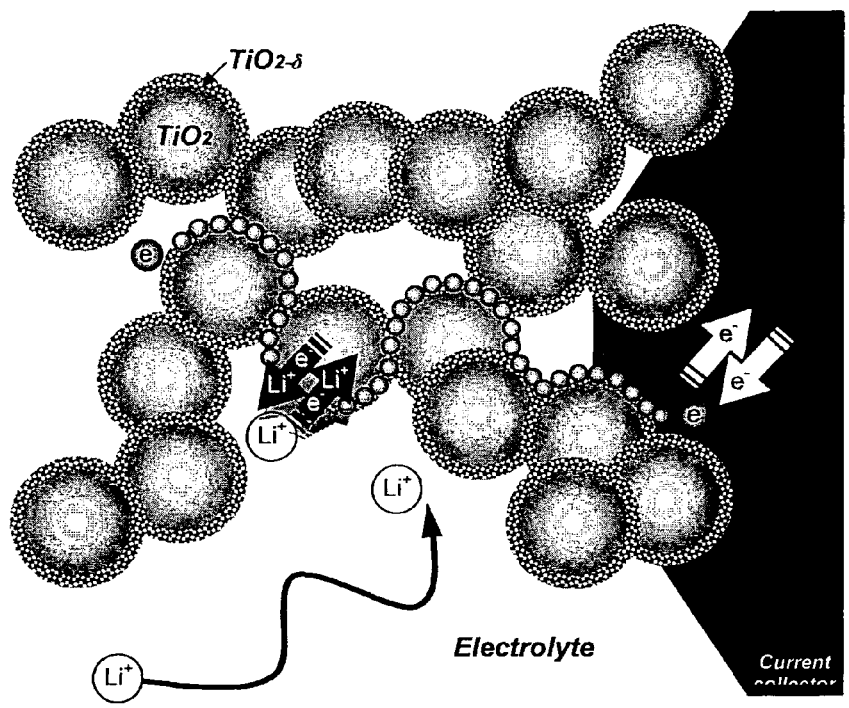
Figure 8:
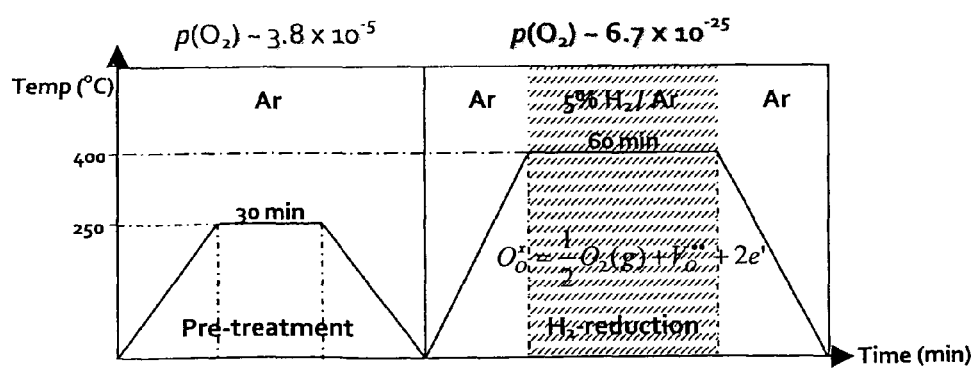
Figure 9:
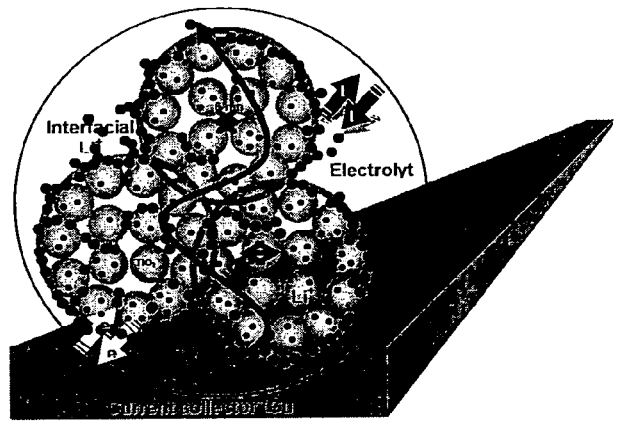
Figure 10:
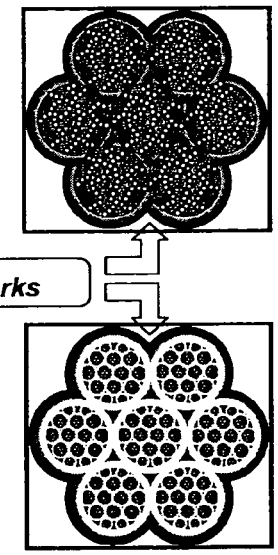
Figure 11:
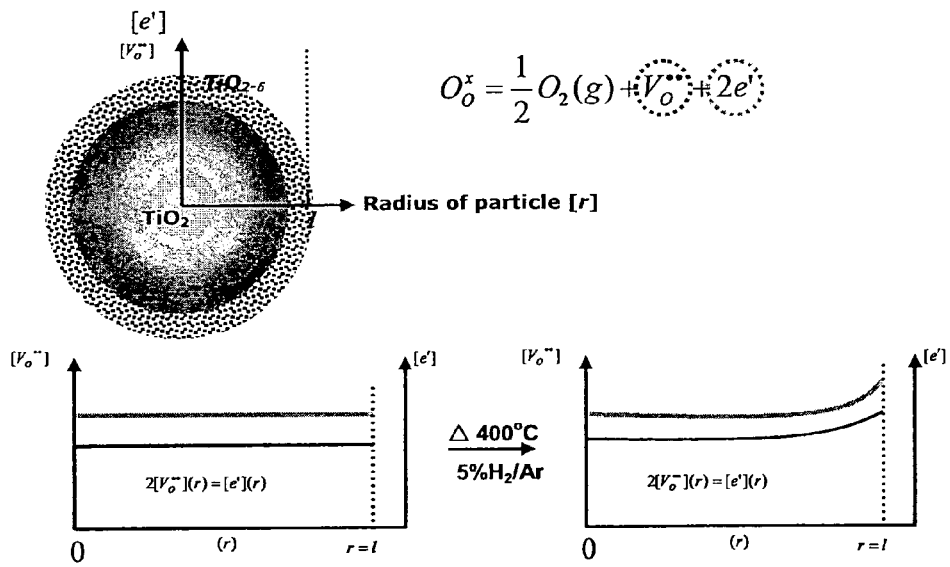
FIG. 11 shows the theoretical background of the charge carrier formation and core shell particle formation upon H$_2$ treatment. The lower right diagram of FIG. 11 illustrates the increase in pore volume size at the outer core radius of the TiO$_2$.
Figure 12:
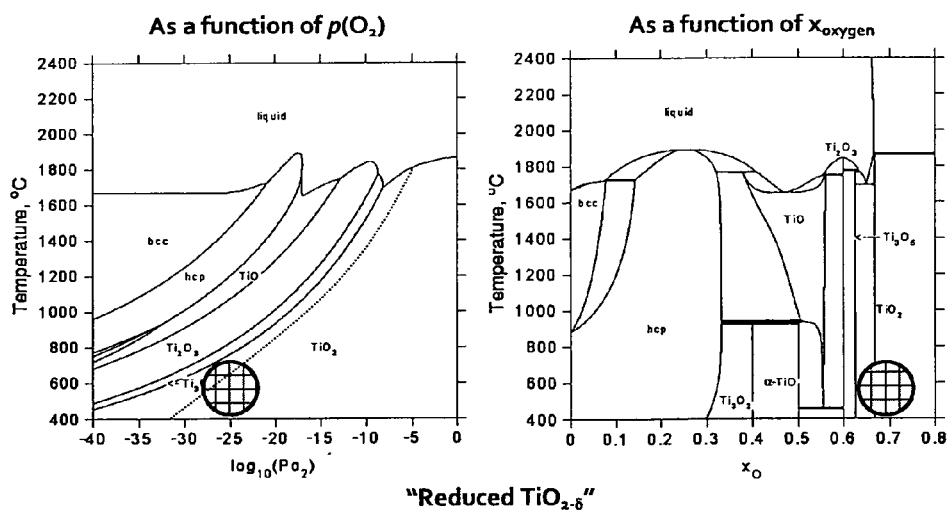
FIG. 12 shows Ti/O phase diagrams. The hashed areas show potential areas from which the treatment conditions can be selected to obtain anatase TiO$_2$.
Figure 13:
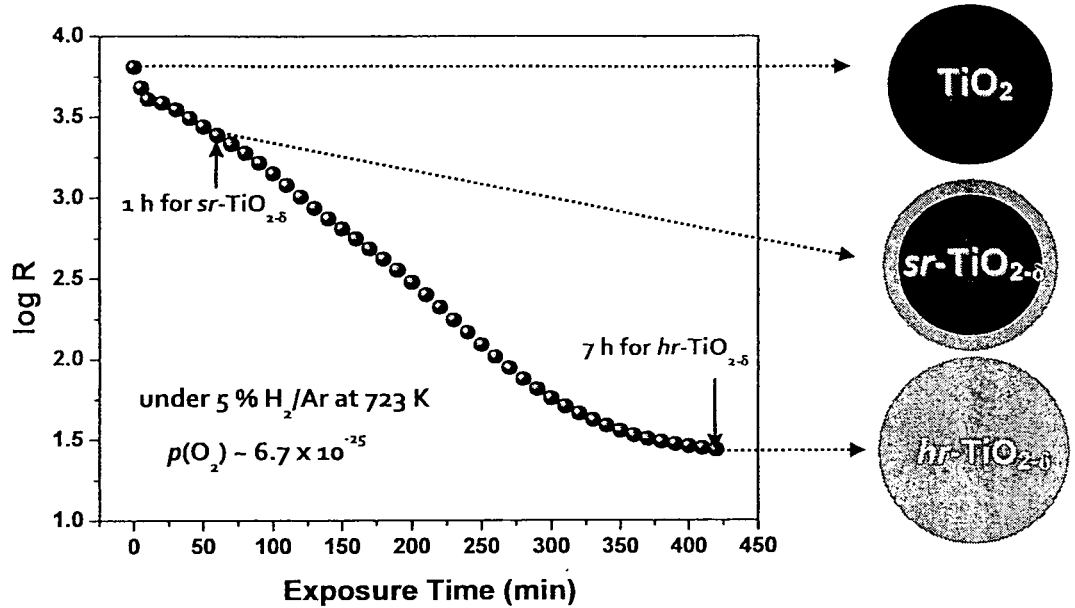

FIG. 13 shows the variation of resistance (i.e. the inverse graph to that shown in FIG. 3) with regard to exposure time. In particular FIG. 12 shows the progress of the shell frontier into the particle. In the case of full equilibrium the whole particle is described by the shell.

Figure 14:
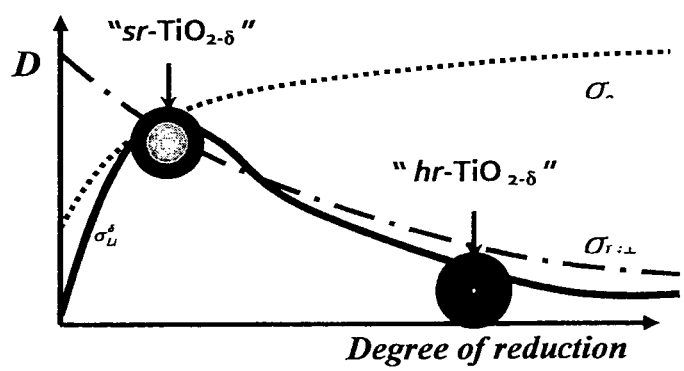

FIG. 14 shows how although the electronic conductivity scales with H$_2$-reduction time, the overall ambipolar lithium conductivity possibly has a maximum value at a certain degree of reduction. From a thermodynamic model of the material, it can be derived that the ionic conductivity of Li$^+$ ($\sigma_{Li+}$) in fact is inversely proportional to the electronic conductivity ($\sigma_{e-}$). Since in non-reduced material, the starting value for $\sigma_{Li+}$ is larger than $\sigma_{e-}$, this leads to a maximum Li ambipolar conductivity as a function of the degree of reduction according to $$\sigma_{Li}^{\delta} = \frac{\sigma_{Li+} \cdot \sigma_{e-}}{\sigma_{Li+} + \sigma_{e-}}.$$

Figure 15:
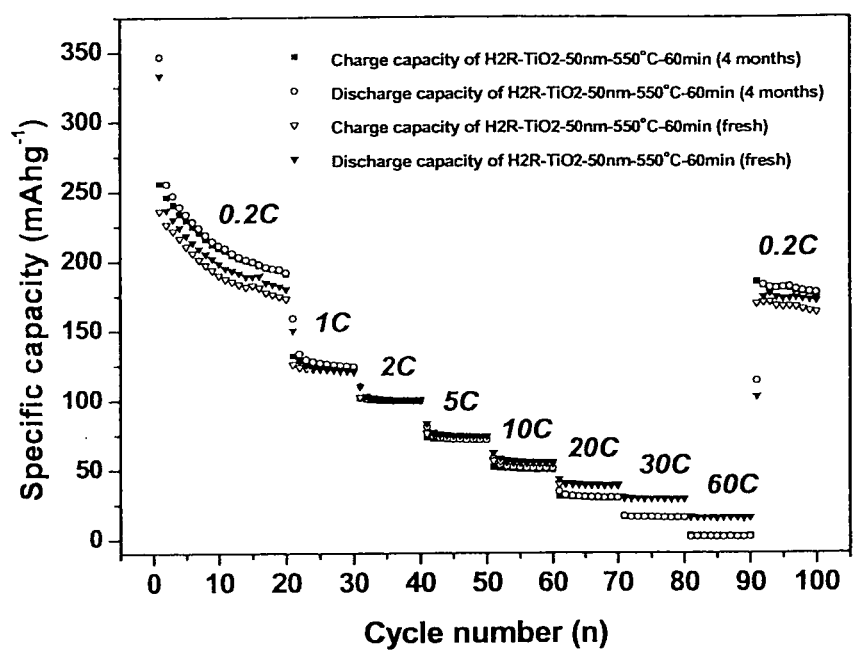

FIG. 15 shows how the re-oxidation of reduced TiO$_{2-\delta}$ particle may influence the stability of electrode performance. For this purpose the rate capability of electrodes kept for four months in an Ar-filled glove box (containing traces of oxygen) were tested at various C rates. Only slight capacity decays were shown at over high C rate of 20 C, maintaining almost similar reversible capacities with those for fresh electrodes. This indicates that the stability of the reduced TiO$_2$ electrodes is fairly good for use in Li-batteries.

Table 1 shows the physiochemical properties of pristine TiO$_2$, Ar-annealed TiO$_2$ and sr-TiO$_{2-\delta}$ and hr-TiO$_{2-\delta}$.

| | Pristine | Ar-annealed TiO$_2$ (1 h) | Ar-annealed TiO$_2$ (1 h) | sr-TiO$_{2-\delta}$ | hr-TiO$_{2-\delta}$ |
|---|---|---|---|---|---|
| Space group | 141/amd | 141/amd | 141/amd | 141/amd | 141/amd |
| Crystalline size (nm) | 17 ± 3 | 29 ± 5 | 29 ± 5 | 29 ± 5 | 29 ± 5 |
| Lattice parameters (Å) | a 3.787 c 9.509 | a 3.790 c 9.520 | a 3.790 c 9.521 | a 3.790 c 9.523 | a 3.791 c 9.524 |

The physicochemical parameters for example, Brunauer-Emmett-Teller (BET) surface area, total pore volume, and average pore radius are summarized below in Table 2.

TABLE 2

| | Pristine TiO$_2$ | Ar-annealed TiO$_2$ (1 h) | Ar-annealed TiO$_2$ (7 h) | sr-TiO$_{2-\delta}$ | hr-TiO$_{2-\delta}$ |
|---|---|---|---|---|---|
| S$_{BET}$ [m$^2$/g] | 174.1 | 160.6 | 160.8 | 153.7 | 150.8 |
| Total pore volume [cc/g] | 0.4839 | 0.4470 | 0.4806 | 0.4411 | 0.4809 |
| Avg. pore radius [nm] | 5.56 | 5.57 | 5.98 | 5.74 | 6.38 |

Table 3 below shows the discharge capacity (in mAh/g) and capacity retention (cap. ret.) after 100 cycles (in %).

TABLE 3

| | Pristine TiO$_2$ | | | Ar-annelaed TiO$_2$ (1 h) | | | Ar-annelaed TiO$_2$ (7 h) | | | sr-TiO$_{2-\delta}$ | | | hr-TiO$_{2-\delta}$ | | |
|---|---|---|---|---|---|---|---|---|---|---|---|---|---|---|---|
| | 1$^{st}$ | 20$^{th}$ | Cap. ret. | 1$^{st}$ | 100$^{th}$ | Cap. ret. | 1$^{st}$ | 100$^{th}$ | Cap. ret. | 1$^{st}$ | 100$^{th}$ | Cap. ret. | 1$^{st}$ | 100$^{th}$ | Cap. ret. |
| 1 C | 195 | 41 | 21 | 267 | 91 | 34 | | | | 307 | 131 | 43 | 196 | 88 | 45 |
| 10 C | 148 | 27 | 18 | 192 | 65 | 34 | | | | 307 | 130 | 42 | 124 | 70 | 56 |

LIST OF REFERENCES

[1] J.-M. Tarascon, M. Armand, Nature, 414, 359-367.
[2] M. S. Whittingham, Chem. Rev. 2004, 104, 4271-4301.
[3] P. G. Bruce, B. Scrosati, J.-M. Tarascon, Angew. Chem. Int. Ed. 2008, 47, 2930-2946.
[4] J. Maier, Nature Mat. 2005, 4, 805-815] P. Poizot, S. Laruelle, S. Grugeon, L. Dupont, [5] P. Poizot, S. Laruelle, S. Grugeon, L. Dupont, J.-M. Tarascon, Nature 2005, 407, 496.
[6] Y.-G. Guo, Y.-S. Hu, and J. Maier, Chem. Commun. 2006, 26, 2783-2785.
[7] Y.-S. Hu, L. Kienle, Y.-G. Guo, and J. Maier, Adv. Mater. 2006, 18(11), 1421-1426. [8] Y.-G. Guo, Y.-S. Hu, W. Sigle, and J. Maier, Adv. Mater. 2007, 19(16), 2087-2091.
[9] A. S. Arico, P. Bruce, B. Scrosati, J.-M. Tarascon, W. Van Schalkwijk, Nat. Mater. 2005, 4, 366-377.
[10] M. G. Kim, J. Cho, Adv. Funct. Mat. 2009, 19, 1497-1514.
[11] Y.-G. Guo, J.-S. Hu, L.-J. Wan, Adv. Mater. 2008, 20, 2878-2887.
[12] H. Zhou, D. Li, M. Hibino, I. Honma, Angew. Chem. Int. Ed. 2005, 44, 797-802.
[13] Shin et al.
[14] J. Wang, J. Polleux, J. Lim, and B. Dunn, J. Phys. Chem. C 2007,
Vol. 111, No. 40,
[15] L. J. Fu, H. Liu, H. P. Zhang, C. Li, T. Zhang, Y. P. Wu, H. Q. Wu, Journal of Power Sources 2006, 159, 219-222]
[16] D.-H. Lee, J.-G. Park, K.-J. Choi, H.-J. Choi, and D.-W. Kim, Eur. J. Inorg. Chem. 2008, 878-882]
[17] R. Dominko, M. Bele, M. Gaberscek, M. Remskar, D. Hanzel, S. Pejovnik, J. Jamnik, J. Electrochem. Soc. 2005, 152, A607_A610]
[18] I. Moriguchi, R. Hidaka, H. Yamada, T. Kudo, H. Murakami, N. Nakashima, Adv. Mater. 2006, 18, 69-73.
[19] D. Wang, D. Choi, J. Li, Z. Yang, Z. Nie, R. Kou, D. Hu, C. Wang, L. V. Saraf, J. Zhang, I. A. Aksay, and J. Liu, ACS Nano 2009, 3, 907-914.
[20] B.-L. He, B. Dong, H.-L. Li, Electrochem. Commun. 2007, 9, 425-430.
[21] J. Nowotny, T. Bak, M. K. Nowotny, L. R. Sheppard, Ionics 2006, 12, 227-243.
[22] D. Eder, and R. Kramer, J. Phys. Chem. B 2004, 108, 14823-14829]
[23] J. L. Hébrard, P. Nortier, M. Pijolat and M. Soustelle, J. Am. Ceram. Soc. 1990, 73, 79.
[24] Q. Zhong, J. M. Vohs, and D. A. Bonnell, J. Am. Ceram. Soc. 1993, 76 (5), 1137-1142.
[25] S. Shukla, S. Seal, R. Vij, and S. Bandyopadhyay, Nano Lett. 2003, 3 (3), 392-401.
[26] A. A. Gribb and J. F. Banfield, American Mineralogist 1997, 82, 717-728]
[27] G. Li, L. Li, J. Boerio-Goates, and B. F. Woodfield, J. Am. Chem. Soc. 2005, 127, 8659-8666.
[28] (SSI 177 (2006) 229-236)
[29] A. Yamada, S. C. Chung, K. Hinokuma, J. Electrochem. Soc. 2001, 148, A224.
[30] Y. Xu, G. Yin, Y. Ma, P. Zuo, X. Cheng, J. Power Source 2010, 195, 2069-2073
[31] J. Ma, C. Wang, S. Wroblewski, J. Power Source 2007, 164, 849-856.
[32] G. Sudant, E. Baudrin, D. Larcher, J. M. Tarascon, J. Mater. Chem. 2005, 15, 1263.
[33] U. Lafont, D. Carta, G. Mountjoy, A. V. Chadwick, and E. M. Kelder, J. Phys. Chem. C 2010, 114, 1372-1378]
[34] C. L. Olson, J. Nelson, M. S. Islam, J. Phys. Chem. B 2006, 110, 9995-10001.

The invention claimed is:

1. An electrode material for a lithium-ion battery comprising a porous agglomeration of particles, the particles being formed by heating, under reducing conditions, from submicron powder of a transition metal oxide, and comprising cores of stoichiometric transition metal oxide surrounded by a shell of an under stoichiometric oxide of the transition metal, wherein the porous agglomerate has pores having sizes in the range from 1 nm to 1 μm, and further wherein the pores within the porous agglomerate comprise a bimodal pore distribution with at least first pores in the size range from 1 nm to 50 nm and at least second pores in the size range from 50 nm to 1 μm, said sizes being the diameters of spheres of equivalent volume to the respective pores.

2. An electrode material in accordance with claim 1, wherein said transition metal oxide is selected from the group consisting of Sc, Ti, V, Cr, Mn, Fe, Co, Cu, Zn, Y, Zr, Nb, Mo, Tc, Ru, Rh, Ag, Cd, La, Hf, Ta, W, Re, Os, Ir, Pt, Au and Hg.

3. An electrode material in accordance with claim 2, wherein said core and/or said shell of surrounding under stoichiometric oxide consists of an oxide of an alloy of two or more transition metals.

4. An electrode material in accordance with claim 1, wherein said particles have average dimensions in the range from 5 nm to 900 nm.

5. An electrode material in accordance with claim 1, wherein said first pores are present with a volume of 1% to 5% of the total volume of an active material of the electrode material and said second pores are present with a volume of 5% to 20% of the total volume of the active material, said upper limit of 1 μm not excluding the presence of up to 10% by volume relative to the total volume of the second pores of pores of larger dimensions and said lower limit of 1 nm not excluding the presence of 1% by volume relative to the total volume of the first pores of pores.

6. An electrode material in accordance with claim 1, wherein, for a tetravalent transition metal oxide the oxygen content of the under stoichiometric oxide lies in the range from 1.6 to 1.99, for a trivalent transition metal oxide the oxygen content of the under stoichiometric oxide lies in the range of 2 to 2.99, and for a hexavalent transition metal oxide the oxygen content of the under stoichiometric oxide lies in the range of 5 to 5.9.

7. An electrode material in accordance with claim 1, wherein a percentage of the under stoichiometric oxide is selected to yield an electrical conductivity in the range from $1.5 \times 10^{-3}$ Siemens/cm to $4.4 \times 10^{-2}$ Siemens/cm in the absence of conductivity enhancing additives.

8. An electrode material in accordance with claim 1, wherein a conductive material is present, in at least said surrounding under stoichiometric oxide.

9. An electrode material in accordance with claim 8, wherein a conductive material is present in said core and said surrounding under stoichiometric oxide.

10. An electrode material in accordance with claim 9, wherein an element of said conductive material is carbon.

11. An electrode material in accordance with claim 8, wherein an element of said conductive material is carbon.

12. An electrode material in accordance with claim 8, wherein the porous agglomerate is bonded to a carrier foil.

13. An electrode material in accordance with claim 1, wherein the porous agglomeration of particles further comprises a conductive material and/or a binder material.

14. Use of an electrode material in accordance with claim 1 as an electrode material in a lithium-ion battery.

15. A method of manufacturing an electrode material for a lithium-ion battery comprising a porous agglomeration of particles, the particles being formed from powder of a transition metal oxide and comprising cores of stoichiometric transition metal oxide surrounded by a shell of an under stoichiometric oxide of the transition metal, the powder optionally comprising a conductive material and/or a binder, the method comprising the steps of: subjecting said powder to a step of pre-treatment that includes heating the electrode material in an inert gas atmosphere at a temperature in the range of 100 to 350° C. for a period in the range of 1 second to 1 hour; heating a powder of a transition oxide material in an inert gas atmosphere, with the addition of a reducing agent at a temperature in the range from 250° C. to 800° C.; selecting an oxygen partial pressure in the atmosphere to be less than $10^{15}$ bar; and carrying out the treatment at the elevated temperature for a time in the range between 1 second and 7 hours.

16. A method in accordance with claim 15, further comprising the steps of: intimately mixing the powder with a conductive material in a particulate form and with a binder; and subsequently roasting the intimately mixed powder, the conductive material, and the binder to remove volatile elements of the binder to leave a porous agglomerate of the powder.

17. A method in accordance with claim 16, further comprising the steps of: applying the mixture of powder and the binder to a metal foil and is roasted roasting the mixture of powder and the binder on the metal foil, whereby the porous agglomerate of powder is formed and bonded to said foil.

\* \* \* \* \*